(12) United States Patent
Yang et al.

(10) Patent No.: US 10,198,480 B2
(45) Date of Patent: Feb. 5, 2019

(54) METHOD AND APPARATUS FOR DETERMINING HOT USER GENERATED CONTENTS

(71) Applicant: TENCENT TECHNOLOGY (SHENZHEN) COMPANY LIMITED, Shenzhen (CN)

(72) Inventors: Yun Yang, Shenzhen (CN); Weigang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 491 days.

(21) Appl. No.: 14/627,632

(22) Filed: Feb. 20, 2015

(65) Prior Publication Data

US 2015/0161140 A1 Jun. 11, 2015

Related U.S. Application Data

(63) Continuation of application No. PCT/CN2013/086839, filed on Nov. 11, 2013.

(30) Foreign Application Priority Data

Jan. 9, 2013 (CN) .......................... 2013 1 0007061

(51) Int. Cl.
G06F 17/30 (2006.01)
(52) U.S. Cl.
CPC ...... *G06F 17/3053* (2013.01); *G06F 17/3089* (2013.01)
(58) Field of Classification Search
CPC .......... H04L 67/02; H04L 67/22; H04L 67/20
See application file for complete search history.

(56) References Cited

U.S. PATENT DOCUMENTS 6,263,507 B1 * 7/2001 Ahmad ............. G06F 17/30787
707/E17.028
2006/0106793 A1 * 5/2006 Liang ................ G06F 17/30654
2007/0061297 A1 3/2007 Bihun et al.
(Continued)

FOREIGN PATENT DOCUMENTS

CN 101305371 A 11/2008
CN 101582086 A 11/2009
(Continued)

OTHER PUBLICATIONS

International Search Report for International Application No. PCT/CN2013/086839, dated Jan. 23, 2014.
(Continued)

*Primary Examiner* — Amanda L Willis
*Assistant Examiner* — Vaishali Shah
(74) *Attorney, Agent, or Firm* — Anova Law Group, PLLC

(57) ABSTRACT

According to an example, at least one hot account is determined for each category according to quality scores and correlation degrees of history user generated content (UGCs); after a UGC newly posted by the hot account is received, if a quality score of the newly posted UGC is higher than a predefined quality score threshold and a correlation degree between the newly posted UGC and the category that the hot account belongs to is higher than a predefined correlation degree threshold, the newly posted UGC is determined as a hot UGC.

14 Claims, 6 Drawing Sheets

(56) References Cited

U.S. PATENT DOCUMENTS

| | | | |
|---|---|---|---|
| 2008/0027979 A1* | 1/2008 | Chandrasekar | G06F 17/30663 |
| 2008/0212846 A1* | 9/2008 | Yamamoto | G06K 9/00087 |
| | | | 382/115 |
| 2008/0275763 A1* | 11/2008 | Tran | G06Q 20/10 |
| | | | 705/35 |
| 2009/0319449 A1* | 12/2009 | Gamon | G06F 17/30014 |
| | | | 706/12 |
| 2010/0036784 A1 | 2/2010 | Mishne et al. | |
| 2010/0169067 A1* | 7/2010 | Basel | G06Q 30/02 |
| | | | 703/21 |
| 2011/0013844 A1* | 1/2011 | Yamada | G06T 7/001 |
| | | | 382/207 |
| 2011/0041075 A1* | 2/2011 | Cierniak | G06Q 30/02 |
| | | | 715/745 |
| 2011/0191105 A1* | 8/2011 | Spears | G06F 17/30867 |
| | | | 704/251 |
| 2012/0209832 A1* | 8/2012 | Neystadt | G06F 17/30867 |
| | | | 707/723 |
| 2012/0254333 A1* | 10/2012 | Chandramouli | G06F 17/27 |
| | | | 709/206 |

FOREIGN PATENT DOCUMENTS

| | | | | |
|---|---|---|---|---|
| CN | 101645082 A | * | 2/2010 | G06F 17/3089 |
| CN | 102708176 A | | 10/2012 | |
| CN | 102754094 A | | 10/2012 | |
| CN | 102779220 A | | 11/2012 | |

OTHER PUBLICATIONS

Chinese Office Action Issued in Chinese Patent Application No. 201310007061.6 dated Oct. 24, 2016, 7 pages.

International Preliminary Report on Patentability Issued in International Application No. PCT/CN2013/086839 dated Jul. 14, 2015, 5 pages.

Office Action Issued in Chinese Application No. 201310007061.6 dated Jun. 23, 2017, 7 pages.

* cited by examiner

METHOD AND APPARATUS FOR DETERMINING HOT USER GENERATED CONTENTS

CROSS-REFERENCE TO RELATED APPLICATIONS

This application is a continuation of International Application No. PCT/CN2013/086839, filed on Nov. 11, 2013. This application claims the benefit and priority of Chinese Patent Application No. 201310007061.6, filed Jan. 9, 2013. The entire disclosures of each of the above applications are incorporated herein by reference.

FIELD

The present disclosure relates to data processing techniques, and more particularly, to a method and an apparatus for determining a hot user generated content (UGC).

BACKGROUND

At present, users are both browsers and creators of website contents. The contents created by network users are referred to as user generated content (UGC), e.g., microblogs posted by the users.

A website system on which user can post UGC is usually referred to as a UGC website system, e.g., microblog system, social network service (SNS) system, social forum system, knowledge sharing system, etc. In the UGC website system, each user may post contents and there may be a large amount of UGCs on the UGC website. Thus, the UGC website system usually selects high quality UGC (also referred to as hot UGC) from the large amount of UGCs and recommends the selected high quality UGC to target users.

SUMMARY

According to an example of the present disclosure, a method for determining a hot data generated content (UGC) is provided. The method includes:

analyzing a history UGC posted by an account in a UGC website system, calculating a quality score of the history UGC posted by the account and a correlation degree between the history UGC and a category, determining a hot account for the category according to the quality score and correlation degree of the history UGC;

after receiving a UGC newly posted by the hot account, calculating a quality score of the newly posted UGC and a correlation degree between the newly posted UGC and the category that the hot account belongs to;

determining whether the quality score of the newly posted UGC is higher than a predefined quality score threshold and whether the correlation degree between the newly posted UGC and the category that the hot account belongs to is higher than a predefined correlation degree threshold of the category; and determining, if the quality score of the newly posted UGC is higher than the predefined quality score threshold and the correlation degree between the newly posted UGC and the category that the hot account belongs to is higher than the predefined correlation degree threshold, that the newly posted UGC is a hot UGC.

According to another example of the present disclosure, an apparatus for determining a hot UGC is provided. The apparatus includes:

one or more processors;
a memory;
wherein one or more program modules are stored in the memory and to be executed by the one or more processors, the one or more program modules comprise:

a hot account determining module, configured to analyze a history UGC posted by an account, a quality score of the history UGC and a correlation degree between the history UGC and a category, and determine, for the category, one or more accounts as hot accounts according to the quality score and the correlation degree of the history UGC; and a hot UGC determining module, configured to calculate, after receiving a UGC newly posted by the hot account, a quality score of the newly posted UGC and a correlation degree between the newly posted UGC and the category that the hot account belongs to;

determine whether the quality score of the newly posted UGC is higher than a predefined quality score threshold of the category and whether the correlation degree is higher than a predefined correlation degree threshold of the category; and determine, if the quality score of the newly posted UGC is higher than the predefined quality score threshold of the category and the correlation degree is higher than the predefined correlation degree threshold of the category, the newly posted UGC as a hot UGC in the category that the hot account belongs to.

According to still another example of the present disclosure, a non-transitory computer-readable storage medium includes a set of instructions for determining a hot UGC is provided, the set of instructions to direct at least one processor to perform acts of:

analyzing a history UGC posted by an account in a UGC website system, calculating a quality score of the history UGC posted by the account and a correlation degree between the history UGC and a category, determining a hot account for the category according to the quality score and correlation degree of the history UGC;

after receiving a UGC newly posted by the hot account, calculating a quality score of the newly posted UGC and a correlation degree between the newly posted UGC and the category that the hot account belongs to;

determining whether the quality score of the newly posted UGC is higher than a predefined quality score threshold and whether the correlation degree between the newly posted UGC and the category that the hot account belongs to is higher than a predefined correlation degree threshold of the category; and if the quality score of the newly posted UGC is higher than the predefined quality score threshold and the correlation degree between the newly posted UGC and the category that the hot account belongs to is higher than the predefined correlation degree threshold, determining that the newly posted UGC is a hot UGC.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of example and not limited in the following figures, in which like numerals indicate like elements, in which.

DETAILED DESCRIPTION

Figure 1:
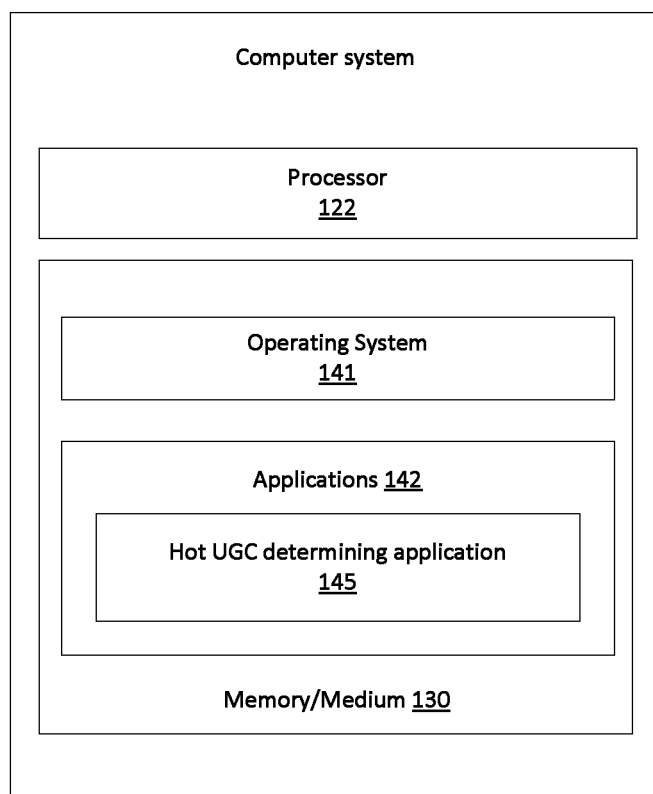
FIG. 1 is a schematic diagram illustrating an example embodiment of a computer system for implementing a method for determining a hot UGC.

The preset disclosure will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In a UGC website system, each user may generate contents. Among these contents, there may be erroneous, fake or prejudiced contents. Therefore, the user generated contents should be filtered or selected. Thereafter, hot contents are selected and provided to target users, such that the target users are capable of browsing their interested contents in time.

In an existing technique, the selected hot contents are provided to users as "hot microblogs". In this technique, a microblog system classifies microblogs into different categories, such as "sports", "finance and economics", "shopping", "news", etc. In each category, one or more accounts are configured as hot accounts by a manager of the microblog system, e.g., according to the number of fans of the account. Microblogs posted by these hot accounts in one category during a period of time are sorted according to forwarding times and number of comments. In other words, for one microblog, the more forwarding times and the number of comments, the higher it ranks.

In the above technique, the hot account is configured according to the number of fans following this account. If the number of fans of an account exceeds a number, the account is configured as a hot account. However, contents posted by an account having many fans are not always hot contents. Similarly, contents posted by an account having few fans are not necessarily low quality contents.

In addition, the above existing technique sorts the UGCs according to the forwarding times and the number of comments, but not according to the contents of the UGCs. Thus, the finally selected hot microblog may be less correlated to target users and the category that it belongs to. For example, a hot account in "sports" category may post a hot microblog related to shopping. However, target users of the "sports" category are less interested in shopping.

Moreover, contents which have more forwarding times and comments are usually posted earlier. Newly posted contents generally have less forwarding times and comments. Therefore, in the above existing technique, newly posted contents have little possibility to be selected as high-quality contents, i.e., hot microblogs. In summary, the high-quality UGC picked out by the conventional high-quality UGC data mining techniques has poor relevance to what the users concerned, and the relevance of the targeted category and the real-time performance are poor as well. This may cause inconvenience to the targeted users to quickly navigate the UGC, and the users may waste more time to find out the UGC they need. At the same time, when the users search contents they need, a large amount of human-computer interactions (such as click and other operations) is required. Each human-computer interaction may occupy the corresponding machine resources and network bandwidth resources. If the high-quality UGC is recommended to the users directly, the users may reduce the amount of human-computer interactions, and the usage of the machine resources and the network bandwidth resources may be also reduced.

In contrast to this, an example of the present disclosure provides a method for determining a hot UGC. In the example of the present disclosure, a UGC website system analyzes history UGCs posted by each account to obtain a quality score of each history UGC and a correlation degree between the history UGC and each category. The UGC website system selects one or more hot accounts in each category according to quality scores and correlation degrees of the history UGCs.

After receiving a UGC newly posted by a hot account, the UGC website system calculates a quality score of the newly posted UGC and a correlation degree between the newly posted UGC and the category that the hot account belongs to. The UGC website system determines whether the quality score is higher than a predefined quality score threshold and whether the correlation degree is higher than a predefined correlation degree threshold of the category. If the quality score is higher than the predefined quality score threshold and the correlation degree is higher than the predefined correlation degree threshold of the category, the newly posted UGC is determined as a hot UGC in the category that the hot account belongs to.

FIG. 1 is a schematic diagram illustrating an example embodiment of a computer system for executing the method for determining a hot UGC. A computer system 100 may be a computing device capable of executing a method and apparatus of present disclosure. The computer system 100 may, for example, be a device such as a server that provides service to users locally or via a network.

The computer system 100 may vary in terms of capabilities or features. Claimed subject matter is intended to cover a wide range of potential variations. For example, the computer system 100 may include or may execute a variety of operating systems 141. The computer system 100 may include or may execute a variety of possible applications 142, such as a hot UGC determining application 145.

Further, the computer system 100 may include one or more non-transitory processor-readable storage media 130 and one or more processors 122 in communication with the non-transitory processor-readable storage media 130. For example, the non-transitory processor-readable storage media 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions, or units and/or modules that comprise the sets of instructions, for conducting operations described in the present application. The one or more processors may be configured to execute the sets of instructions and perform the operations in example embodiments of the present application.

Figure 2:
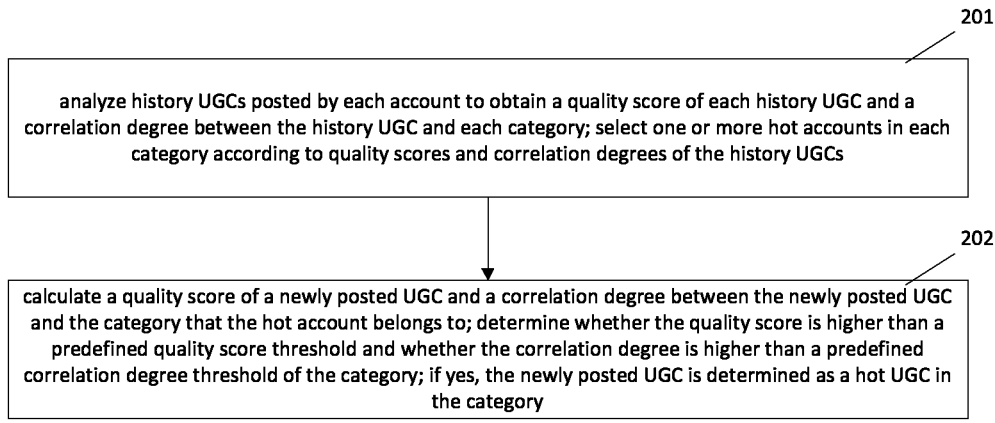
FIG. 2 is a flowchart illustrating a method for determining a hot UGC according to an example of the present disclosure.

FIG. 2 is a schematic diagram illustrating a method for determining a hot UGC according to an example of the present disclosed hot UGC determining application 145. FIG. 2 is a simplified diagram according to one embodiment of the present invention. This diagram is merely an example, which should not unduly limit the scope of the claims. One of ordinary skill in the art would recognize many variations, alternatives, and modifications.

As shown in FIG. 2, the method includes at least the following.

At block 201, a UGC website system analyzes history UGCs posted by each account to obtain a quality score of each history UGC and a correlation degree between the history UGC and each category. The UGC website system selects one or more hot accounts in each category according to quality scores and correlation degrees of the history UGCs.

This block may involve a large amount of calculations. Thus, this block may be performed offline.

Figure 3:
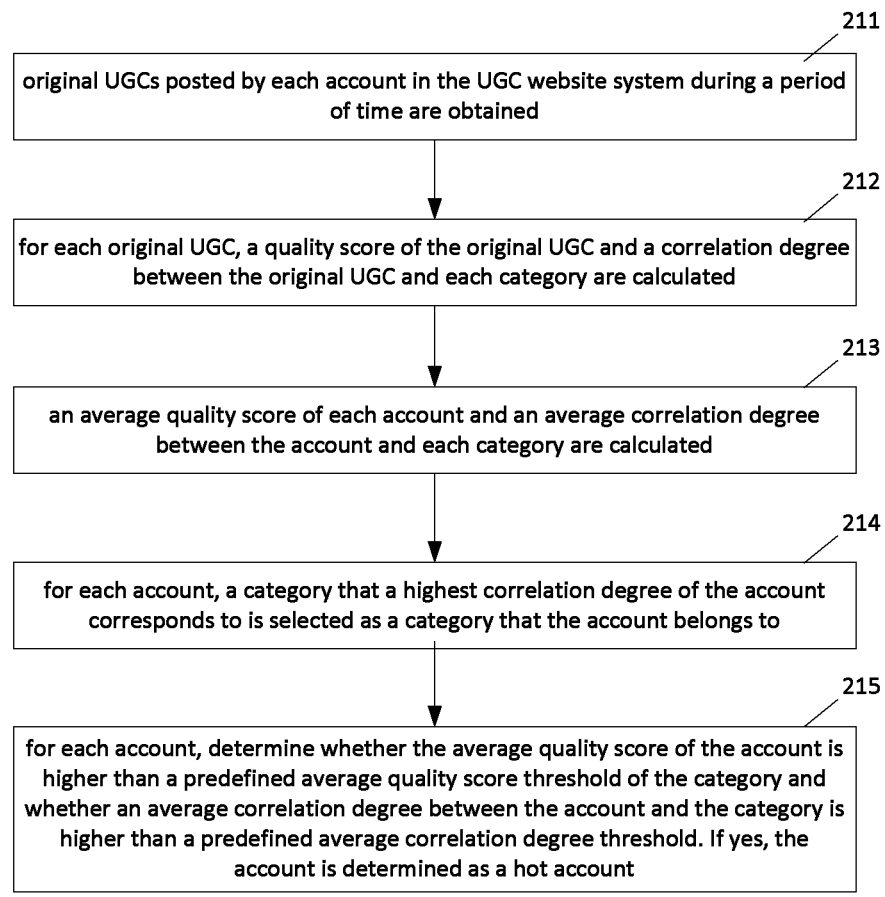
FIG. 3 is a flowchart illustrating a process of determining a hot account in block 201 of FIG. 2 according to an example of the present disclosure.

FIG. 3 is a flowchart illustrating a process of obtaining one or more hot accounts in block 201 according to an example of the present disclosure.

As shown in FIG. 3, the process includes the following. In the example, it is possible to consider only original UGCs posted by each account.

At block 211, one or more original UGCs posted by each account during a period of time (e.g., last two months) are obtained.

At block 212, for each original UGC, a quality score of the original UGC and a correlation degree between the original UGC and each category are calculated.

At block 213, for each account, an average quality score of the account and an average correlation degree between the account and each category are calculated according to the quality scores of the original UGCs and the correlation degrees between the original UGCs and each category, wherein $$\text{the average quality score of an account} = \frac{\text{a sum of quality scores of the original } UGCs \text{ posted by the account}}{\text{the number of the original } UGCs \text{ posted by the account}};$$

$$\text{the average correlation degree between an account and a category} = \frac{\text{a sum of correlation degrees between the original } UGCs \text{ and the category}}{\text{the number of the original } UGCs \text{ posted by the account}}.$$

At block 214, for each account, a category that a highest correlation degree of the account corresponds to is selected as a category that the account belongs to.

In block 213, for each account, a correlation degree between the account and each category is calculated. Thus, one account may correspond to one correlation degree in each category. Therefore, in block 214, the category that the highest correlation degree of the account corresponds to is selected as the category that the account belongs to.

At block 215, for each account, it is determined whether the average quality score of the account is higher than a predefined average quality score threshold of the category that the account belongs to and whether an average correlation degree between the account and the category that the account belongs to is higher than a predefined average correlation degree threshold. If the average quality score of the account is higher than the predefined average quality score threshold of the category that the account belongs to and the average correlation degree between the account and the category that the account belongs to is higher than the predefined average correlation degree threshold, the account is determined as a hot account in the category that the account belongs to. Otherwise, the account is not a hot account.

As described above, the quality score of each original UGC and the correlation degree between the original UGC and each category are important parameters for determining a hot account. Based on the above two parameters, i.e., the quality score and the correlation degree, another parameter may be generated and acts as a basis for determining a hot account.

For example, in block 212, after the quality score of each original UGC and the correlation degree between the original UGC and each category are calculated, it is possible to multiply the quality score of the original UGC by the correlation degree between the original UGC and each category to obtain a reliability degree of the original UGC in each category. The reliability degree is a derived parameter which may be used as a basis for determining the hot account.

At this time, block 213 further includes: calculating an average reliability degree of each account with respect to each category according to the reliability degrees of original UGCs posted by the account in each category, wherein $$\text{the average reliability degree of an account in a category} = \frac{\text{a sum of reliability degrees of the original } UGCs \text{ posted by the account in the category}}{\text{the number of original } UGCs \text{ posted by the account}}$$

In addition, block 215 further includes: for each account, after it is determined that the average quality score of the account is higher than the predefined average quality score threshold and the average correlation degree between the account and the category that the account belongs to is higher than the predefined average correlation degree threshold, it is further determined whether the average reliability degree of the account in the category is higher than a predefined average reliability degree threshold. If yes, the account is determined as a hot account. Otherwise, the account is not a hot account.

Through the above block 201, one or more accounts may be determined as hot accounts in one category.

At block 202, after receiving a UGC newly posted by a hot account, the UGC website system calculates a quality score of the newly posted UGC and a correlation degree between the newly posted UGC and the category that the hot account belongs to. The UGC website system determines whether the quality score is higher than a predefined quality score threshold and whether the correlation degree is higher than a predefined correlation degree threshold of the category. If the quality score is higher than the predefined quality score threshold and the correlation degree is higher than the predefined correlation degree threshold of the category, the newly posted UGC is determined as a hot UGC in the category that the hot account belongs to.

In one example, the UGC website system may execute block 202 each time it receives a UGC newly posted by a hot account. Alternatively, the UGC website system may also execute block 202 periodically, i.e., after a certain period of time (e.g., every 10 minutes). At this time, the UGC website system executes block 202 to process each UGC newly posted during this period of time.

In the above blocks 201 and 202, the quality score of a UGC has to be calculated. In block 201, the quality score of a history UGC is calculated. In block 202, the quality score of a newly posted UGC is calculated. The calculation of the quality score in blocks 201 and 202 may be performed following a same manner or different manners. Hereinafter, one exemplary calculation manner is provided. Those with ordinary skill in the art may have other calculation manners to calculate the quality score of the history UGC or the newly posted UGC, which is not restricted in the present disclosure.

A total text length, number of words, number of filtered words and number of punctuations in a UGC are obtained. The number of filtered words refers to the number of words which match predefined filtering words.

The number of effective words of the UGC is determined, wherein the number of effective words = total number of words − number of filtered words − number of punctuations

A text basic score of the UGC is determined, wherein the text basic score =

$w5 \times$ number of effective words + $w6 \times$ number of filtered words, w5 and w6 are weight parameters which may be determined based on training data.

A number of repeated words of the UGC and a word repetition ratio are determined; wherein $$\text{the word repetition ratio} = \frac{\text{number of repeated words}}{\text{total number of words}}.$$

A text score of the UGC is determined; wherein the text score = text basic score ×

$$\frac{\text{number of effective words}}{\text{total number of words}} \times f1 \times (1 - \text{word repetition ratio})/w4,$$

wherein f1 is a predefined function taking the number of punctuations and the total number of words as input parameters, w4 is a weight parameter.

A posted time of the UGC is obtained and a time score of the UGC is calculated, wherein $$\text{the time score} = \frac{\text{posted time of the } UGC - \text{predefined reference time}}{w7},$$

wherein w7 is a weight parameter.

The quality score of the UGC is determined, wherein the quality score=$w1 \times (w2 \times$text score+$w3 \times$time score), wherein w1, w2 and w3 are weight parameters.

Now, through the above process, the quality score of each UGC (e.g., a history UGC or a newly posted UGC) is calculated.

Besides the quality score, in blocks 201 and 202, a correlation degree between the UGC and a category is also required to be calculated. Specifically, in block 201, the correlation degree between the history UGC and each category is calculated. In block 202, the correlation degree between a newly posted UGC and the category that the hot account which posts the new UGC belongs to is calculated. It should be noted that, the correlation degree may be calculated in a same manner or different manners in blocks 201 and 202. One exemplary calculation manner of the correlation degree is described in the following. Those with ordinary skill in the art may have other calculation manners to determine the correlation degree, which is not restricted in the present disclosure.

One exemplary formula is as follows:

Correlation degree=$W1*F1$(weight)+$W2*F2$(rate)+ $W3*F3$(rank).

W1, W2 and W3 are three weight parameters.

Weight denotes weight of the category.

Rate denotes a value that the weight of the category is divided by a total weight.

Rank denotes a ranking position of the category in all categories.

F1 denotes a function for normalizing the weight to 0-1.

F2 denotes a function for normalizing the rate to 0-1.

F3 denotes a function for normalizing the rank to 0-1.

Through the above blocks 201 and 202, it is possible to determine one or more hot accounts according to quality scores of history UGCs and correlation degrees between the history UGCs and the categories. Compared with the existing technique in which the hot account is determined according to number of fans or other subjective factors (e.g., configured by a network manager manually), the method provided by the example of the present disclosure determines the hot accounts based on the contents of the UGC posted by all accounts. The determination is more objective. In addition, the contents of the hot UGC selected from the UGCs posted by these hot accounts have a high correlation degree with contents that the users are interested in, and also have a high correlation degree with the category that it belongs to. Moreover, the method provided by the example of the present disclosure is capable of performing the selection operation after a newly posted UGC is received. Thus, the hot UGC may be provided to users rapidly.

Figure 4:
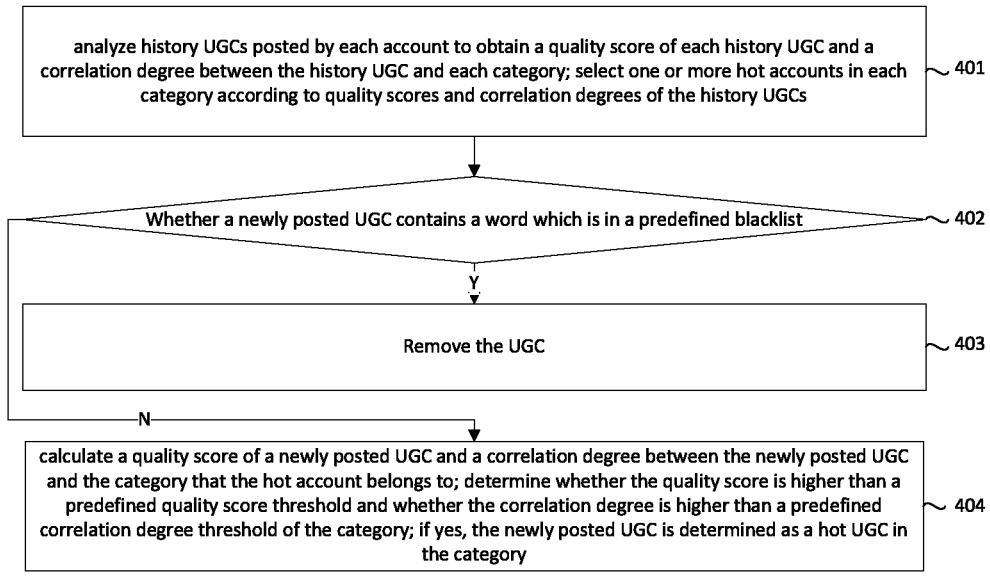
FIG. 4 is a schematic diagram illustrating a method for determining a hot UGC according to another example of the present disclosure.

FIG. 4 is a flowchart illustrating a method for determining a hot UGC according to another example of the present disclosure.

As shown in FIG. 4, the method includes the following.

Block 401 is the same with block 201.

At block 402, for a newly posted UGC, it is determined that whether the UGC contains a word which is in a predefined blacklist. If yes, the UGC is removed at block 403, i.e., not considered and no further calculation is performed to this UGC. Otherwise, block 404 is performed.

Through blocks 402 and 403, it is possible to remove UGC containing words which are in the blacklist. The quality of the hot UGC may be increased. The number of candidate UGCs may be reduced, which reduces workload of subsequent calculation.

Block 404 is the same with block 202.

It should be noted that, the calculation of the quality score of the newly posted UGC and the correlation degree between the newly posted UGC and the category in block 202 may be performed each time a newly posted UGC is received or periodically (e.g., every 10 minutes). If the calculation is performed periodically, a repetition removing operation may be performed before the quality score and the correlation degree are calculated.

For example, microblogs in following table 1 are obtained.

TABLE 1

| account | index | Microblog contents |
|---|---|---|
| a | 1 | Dave noted on Tuesday that progress has seemingly been halted in the ongoing labor negotiations between the NBA and the National Basketball Players Association. Here's a look at how some of the players competing at Impact Basketball's "Lockout League" in Las Vegas took the news. There's definitely some rising frustration with the lack of progress. |
|  | 2 | Spears's aunt Sandra Bridges Covington, with whom she had been very close, died of ovarian cancer in January. In February 2007, Spears stayed in a drug rehabilitation facility in Antigua for less than a day. The following night, she shaved her head with electric clippers at a hair salon in Tarzana, Los Angeles. |
| b | 3 | The Su-27 is a highly integrated twin-finned aircraft. The airframe is constructed of titanium and high-strength aluminum alloys. The engine nacelles are fitted with trouser fairings to provide a continuous streamlined profile between the nacelles and the tail beams. The fins and horizontal tail consoles are attached to tail beams. |
|  | 4 | Scorpios love competition in both work and play, which is why they'll air it out in sports and games. Extreme sports are right up Scorpio's alley, as is most anything that will test their mettle. They've got to have an adversary, since it makes the game that much more fun. Scorpio's colors? Powerful red and serious black. When it comes to love, though, Scorpios soften up a bit and are caring and devoted with their lovers, even if they do hold on a bit tight. |
|  | 5 | NBA Players in Vegas React To Lockout Negotiations Stalling In NYC |

Figure 5:
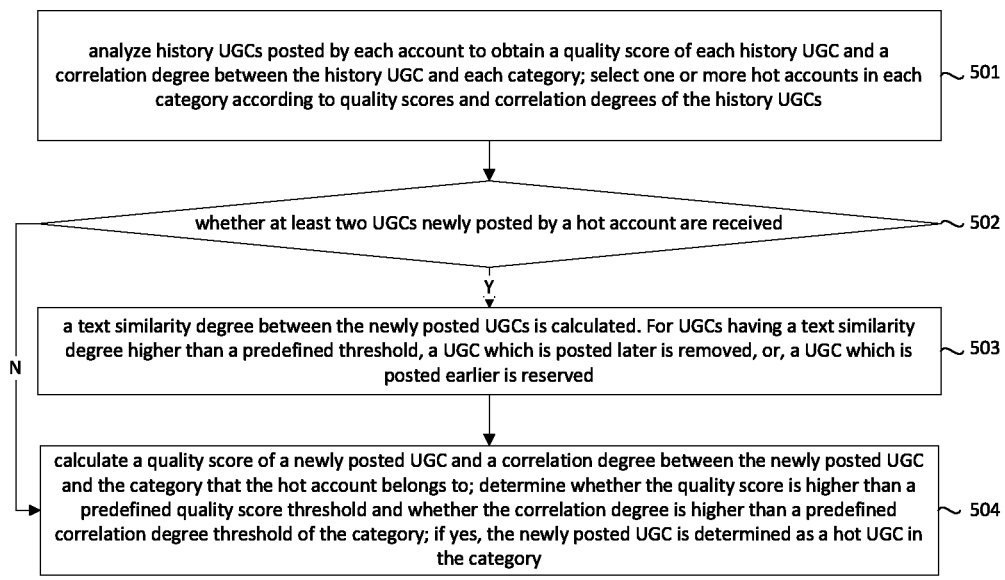
FIG. 5 is a schematic diagram illustrating a method for determining a hot UGC according to still another example of the present disclosure.

FIG. 5 is a flowchart illustrating a method for determining a hot UGC according to still another example of the present disclosure. As shown in FIG. 5, the method includes the following.

Block 501 is the same with block 201.

At block 502, it is determined whether at least two UGCs newly posted by a hot account are received. If yes, block 503 is performed. Otherwise, block 504 is performed.

At block 503, a text similarity degree between the newly posted UGCs is calculated. For UGCs having a text similarity degree higher than a predefined threshold, a UGC which is posted later is removed, or, a UGC which is posted earlier is reserved.

Thus, the following calculation is only performed for the reserved UGC. The number of candidate UGCs is reduced and the workload of the subsequent calculation is reduced.

The calculation of the text similarity degree between the newly posted UGCs may be as follows: perform a word segmentation operation to each newly posted UGC to obtain notional words (i.e., words having meanings themselves), calculate a notional word repetition ratio between each two UGCs. The notional word repetition ratio is the word similarity degree. For two UGCs having a notional word repetition ratio higher than a predefined threshold, only the UGC which is posted earlier is reserved for further processing.

Block 504 is the same with block 202.

In examples of the present disclosure, the UGC website system may be a microblog system, a social network service (SNS) system, a social forum system, a knowledge sharing system, etc. Hereinafter, the microblog system is taken as an example to describe an implementation of the present disclosure. In the following, the microblog is the UGC described in the above examples.

Figure 6:
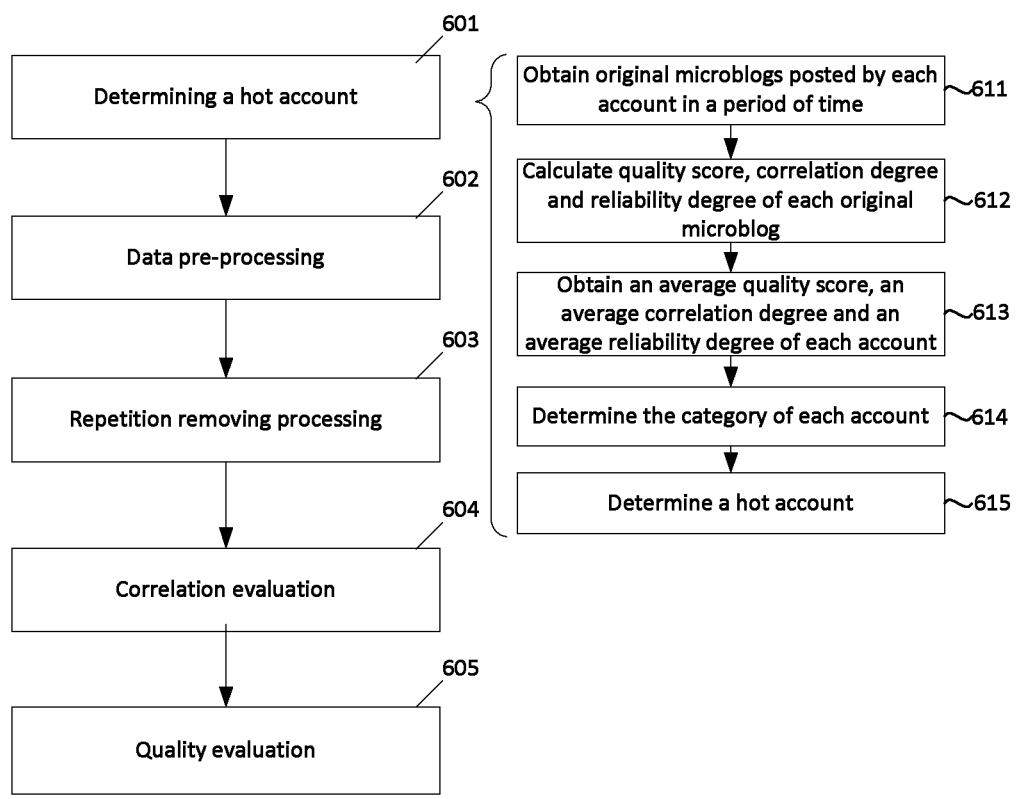
FIG. 6 is a schematic diagram illustrating a method for determining a hot UGC applied in a microblog system according to an example of the present disclosure.

FIG. 6 is a flowchart illustrating a method for determining a hot UGC applied in a microblog system according to an example of the present disclosure. As shown in FIG. 6, the method includes the following.

At block 601, one or more hot accounts in each category are determined. This block may specifically include the following blocks 611 to 615.

At block 611, original microblogs posted by each account within a certain period (e.g., last two months) are obtained.

At block 612, a quality score of each original microblog, a correlation degree between each original microblog and each category and a reliability degree of each original microblog in each category are calculated.

Suppose that a formula for calculating the quality score is as follows:

Quality score=700000*(0.5*text score+0.4*(posted time of the microblog−1293811200)/$w7$),
wherein $w7$=3600*87600;

wherein text score=(total text length+5*(total number of words−number of filtered words−number of punctuations)−20*number of filtered words)*(total number of words−number of filtered words−number of punctuations)/total number of words*f1 (number of punctuations, total number of words)*(1−number of repeated words/total number of words)/840.

The function f1 may be obtained through analyzing of training data. An example is as follows.

The value of f1 is 1 in default.

If the number of punctuations is 0, f1=0.3 if the total length is larger than 300, f1=0.6 if the total length is larger than 100, and f1=0.88 if the total length is larger than 70.

If the number of punctuations is larger than 40, f1=0.74.
If the number of punctuations is larger than 30, f1=0.82.
If the number of punctuations is larger than 20, f1=0.92.
If a quotient obtained by dividing the number of punctuations by the total length is smaller than 0.03, f1=0.73.
If a quotient obtained by dividing the number of punctuations by the total length is smaller than 0.05, f1=0.9.

Herein, suppose that a formula for calculating the correlation degree between a microblog and a category is as follows.

Correlation degree=0.2*$F1$ (weight)+0.6*$F2$ (rate)+ 0.2*$F3$ (rank).

F1 is defined as follows:
If weight>3, F1=1;
Otherwise, F1=pow (weight/3, 0.2).
F2 is defined as follows:
If rate>0.5, F2=1;
Otherwise, F2=pow (rate/0.5, 0.4).

F3 is defined as follows:
If rank>10, F3=0;
Otherwise, F3=pow ((11.0−rank)/10.0, 1.5).

Hereinafter, the microblog 1 is taken as an example to describe the calculation of the quality score, the correlation degree and the reliability degree.

(1) The calculation of the quality score of the microblog 1.

The total text length of microblog 1 is 134, total number of words is 35, number of punctuations is 9, number of filtered words is 0, and the number of repeated words is 0.

The text score of the microblog 1=(134+5*(35−0−9)−20*0)*(35−0−9)/35*1*(1−0/35)/840=0.233469.

The time score of microblog 1=(1354621754−1293811200)/3600/87600=0.192829.

The quality score of microblog 1=700000*(0.5*text score+0.4*time score)=700000*(0.5*0.233469+0.4*0.192829)=135706.

(2) The calculation of the correlation degree between microblog 1 and each category.

A weight of each word in each category may be obtained through a training method such as term frequency-inverse document frequency (TF-IDF). Then a word classification table with weight is obtained. According to the word classification table, the weight of each word segmented from the microblog in each category may be obtained. For example, the weight of each word segmented from microblog 1 in each category is as shown in table 2.

TABLE 2

| word | category | weight |
| --- | --- | --- |
| nba | basketball | 1.000000 |
| lockout | basketball | 0.529648 |
| player | basketball | 0.205528 |
| player | football | 0.197445 |
| disclose | news | 0.120000 |
| message | news | 0.120000 |
| price | shopping | 0.100000 |
| accept | quotation | 0.100000 |

TABLE 2-continued

| word | category | weight |
| --- | --- | --- |
| disclose | military | 0.100000 |
| news | military | 0.100000 |

According to table 2 and the formula of correlation degree 0.2*F1 (weight)+0.6*F2 (rate)+0.2*F3 (rank), a correlation degree between microblog 1 and each category may be obtained, as shown in table 3.

TABLE 3

| category | weight | rate | rank | Correlation degree |
| --- | --- | --- | --- | --- |
| basketball | 1.735176 | 0.208239 | 1 | 0.990000 |
| news | 0.240000 | 0.028802 | 2 | 0.306711 |
| military | 0.200000 | 0.024002 | 3 | 0.256398 |
| football | 0.197445 | 0.023695 | 4 | 0.228975 |
| quotation | 0.100000 | 0.012001 | 5 | 0.149597 |
| shopping | 0.100000 | 0.012001 | 6 | 0.127356 |

(3) The calculation of the reliability degree of microblog 1 in each category. A following formula may be used: reliability degree=quality score*correlation degree of the microblog in the category. A calculated result may be as shown in table 4.

TABLE 4

| category | Correlation degree | reliability |
| --- | --- | --- |
| basketball | 0.990000 | 134348 |
| news | 0.306711 | 41622 |
| military | 0.256398 | 34794 |
| football | 0.228975 | 31073 |
| quotation | 0.149597 | 20301 |
| shopping | 0.127356 | 17282 |

Based on the above calculations of the quality score, the correlation degree and the reliability degree, a result as shown in table 5 may be obtained.

TABLE 5

| account | index | Microblog contents | Quality score | Related category | Correlation degree | Reliability degree |
| --- | --- | --- | --- | --- | --- | --- |
| a | 1 | Dave noted on Tuesday that progress has seemingly been halted in the ongoing labor negotiations between the NBA and the National Basketball Players Association. Here's a look at how some of the players competing at Impact Basketball's "Lockout League" in Las Vegas took the news. There's definitely some rising frustration with the lack of progress. | 135706 | basketball Current events Military Football Quotation shopping | 0.990000 0.306711 0.256398 0.228975 0.149597 0.127356 | 134348 41622 34794 31073 20301 17282 |
| | 2 | Spears's aunt Sandra Bridges Covington, with whom she had been very close, died of ovarian cancer in January. In February 2007, Spears stayed in a drug rehabilitation facility in Antigua for less than a day. The following night, she | 164149 | basketball auto digital family quotation telecom history fun politics Love | 0.930000 0.510763 0.483108 0.261693 0.177987 0.155746 0.120424 0.092388 0.060536 0.048842 | 152658 83841 79301 42956 29216 25565 19767 15165 9936 8017 |

TABLE 5-continued

| account | index | Microblog contents | Quality score | Related category | Correlation degree | Reliability degree |
|---|---|---|---|---|---|---|
| | | shaved her head with electric clippers at a hair salon in Tarzana, Los Angeles. | | Current events | 0.021259 | 3489 |
| b | 3 | The Su-27 is a highly integrated twin-finned aircraft. The airframe is constructed of titanium and high-strength aluminum alloys. The engine nacelles are fitted with trouser fairings to provide a continuous streamlined profile between the nacelles and the tail beams. The fins and horizontal tail consoles are attached to tail beams. | 130740 | military politics Science work Auto Foreign language IT travel | 1.000000 0.327131 0.230002 0.184141 0.143291 0.109144 0.077400 0.049616 | 130740 42769 30070 24074 18733 14269 10119 6486 |
| | 4 | Scorpios love competition in both work and play, which is why they'll air it out in sports and games. Extreme sports are right up Scorpio's alley, as is most anything that will test their mettle. They've got to have an adversary, since it makes the game that much more fun. Scorpio's colors? Powerful red and serious black. When it comes to love, though, Scorpios soften up a bit and are caring and devoted with their lovers, even if they do hold on a bit tight. | 149081 | constellation Love quotation Fun beauty Current events | 0.980000 0.430763 0.397950 0.229745 0.186795 0.127017 | 146099 64218 59326 34250 27833 18933 |
| | 5 | NBA Players In Vegas React To Lockout Negotiations Stalling In NYC | 128133 | basketball fun Video Football music dance quotation clothing | 0.995000 0.470763 0.259470 0.226073 0.148228 0.124404 0.094198 0.076465 | 12749 60222 33186 28958 18963 15888 12044 9738 |

At block 613, based on the above data, an average quality score of each account, an average correlation degree between the account and each category and an average reliability degree of the account in each category are obtained, as shown in table 6.

TABLE 6

| account | Number of microblogs | Quality score | Related category | Correlation degree | Reliability degree |
|---|---|---|---|---|---|
| a | 2 | 144359 | Basketball auto Digital Current events Military | 0.960000 0.255381 0.241554 0.153356 0.128199 | 138031 41931 39661 19109 15974 |
| b | 3 | 135986 | Military basketball Constellation Fun Current events Quotation Politics Video science | 0.333333 0.331667 0.326667 0.156921 0.143588 0.132650 0.109044 0.086490 0.076667 | 43594 42512 48713 20113 21412 19781 14261 11086 10026 |

At block 614, for each account, a category that a highest average correlation degree of the user corresponds to is selected as the category that the account belongs to. For example, as shown in table 6, account "a" belongs to category "basketball" and account "b" belongs to category "military".

At block 615, a hot account is obtained. Herein, suppose a selection criterion of the hot account is that the following three conditions are met:

1) quality score>70000;

2) correlation degree>0.3; and 3) reliability degree>65000.

According to the above selection criterion, account a is a hot account in category "basketball" and account b is discarded.

Through the above blocks, a hot account is obtained. After the microblog system receives a microblog posted by the hot account, the following blocks 602 to 606 may be performed.

Suppose microblogs of three hot accounts A, B and C are received, as shown in table 7.

TABLE 7

| Hot account | category | Microblog index | Microblog contents |
|---|---|---|---|
| A | quotation | 1 | Love means never having to say you're sorry |
| | | 2 | Your opening shows great promise, and yet flashy purple patches; as when describing a sacred grove, or the altar of Diana, or a stream meandering through fields, or the river Rhine, or a rainbow; but this was not the place for them. If you can realistically render a cypress tree, would you include one when commissioned to paint a sailor in the midst of a shipwreck? |
| | | 3 | Poetic diction treats the manner in which language is used, and refers not only to the sound but also to the underlying meaning and its interaction with sound and form. Many languages and poetic forms have very specific poetic dictions, to the point where distinct grammars and dialects are used specifically for poetry. |
| B | basketball | 4 | the last minute kill shot |
| | | 5 | Jeremy Lin scored 28 points and dished out a career-high 14 assists as the New York Knicks got back on the winning column after defeating the Dallas Mavericks, winners of six straight, with a 104-97 victory at the MSG |
| | | 6 | Lin has now surpassed 20 points for the eighth time in nine contests on Sunday, as he shot 11-of-20 from the floor and 3-of-6 from the three-point line. He scored 16 points in the second half, which included a couple of timely three-pointers in the fourth quarter. |
| C | food | 7 | Certain cultures highlight animal and vegetable foods in their raw state. Salads consisting of raw vegetables or fruits are common in many cuisines. Sashimi in Japanese cuisine consists of raw sliced fish or other meat, and sushi often incorporates raw fish or seafood. |
| | | 8 | the last minute kill shot |
| | | 9 | sales promotion, 13205593099 |

At block 602, data pre-processing is performed. Suppose that word "diction" is in the blacklist. Thus, microblog 3 is filtered and other microblogs pass the pre-processing.

At block 603, data repetition removing operation is performed. The microblogs are segmented to obtain notional words. A notional repetition ratio between each two microblogs is calculated. If the notional repetition ratio is higher than a predefined threshold, it is determined that the two microblogs are similar and the one which is posted earlier is reserved.

In this example, microblogs 4 and 8 have a repetition ratio higher than the predefined threshold. Therefore, the microblog 4 which is posted later is removed. Subsequent operations are performed to other microblogs.

At block 604, a microblog correlation evaluation operation is performed.

According to a correlation degree calculation method similar to block 612, a correlation degree of each microblog is calculated. According to the predefined average correlation degree threshold, it is determined whether the microblog passes the evaluation. If the evaluation is not passed, the microblog is removed. A result is shown in table 8.

TABLE 8

| Hot account | category | Correlation degree threshold | Microblog index | Microblog contents | Correlation degree | Correlation evaluation |
|---|---|---|---|---|---|---|
| A | quotation | 0.85 | 1 | Love means never having to say you're sorry | 0.83 | Not pass |
| | | | 2 | Your opening shows great promise, and yet flashy purple patches; as when describing a sacred grove, or the altar of Diana, or a stream meandering through fields, or the river Rhine, or a rainbow; but this was not the place for them. If you can realistically render a cypress tree, would you include one when commissioned to paint a sailor in the midst of a shipwreck? | 0.83 | Not pass |

TABLE 8-continued

| Hot account | category | Correlation degree threshold | Microblog index | Microblog contents | Correlation degree | Correlation evaluation |
|---|---|---|---|---|---|---|
| B | basketball | 0.85 | 4 | the last minute kill shot | 0.816683 | Not pass |
| | | | 5 | Jeremy Lin scored 28 points and dished out a career-high 14 assists as the New York Knicks got back on the winning column after defeating the Dallas Mavericks, winners of six straight, with a 104-97 victory at the MSG | 0.87 | pass |
| | | | 6 | Lin has now surpassed 20 points for the eighth time in nine contests on Sunday, as he shot 11-of-20 from the floor and 3-of-6 from the three-point line. He scored 16 points in the second half, which included a couple of timely three-pointers in the fourth quarter. | 1 | pass |
| C | food | 0.86 | 7 | Certain cultures highlight animal and vegetable foods in their raw state. Salads consisting of raw vegetables or fruits are common in many cuisines. Sashimi in Japanese cuisine consists of raw sliced fish or other meat, and sushi often incorporates raw fish or seafood. | 0.995 | pass |
| | | | 9 | sales promotion, 13205593099 | 0 | Not pass |

After the correlation evaluation operation, a following table 9 is obtained.

TABLE 9

| Hot account | category | Microblog index | Microblog contents |
|---|---|---|---|
| B | basketball | 5 | Jeremy Lin scored 28 points and dished out a career-high 14 assists as the New York Knicks got back on the winning column after defeating the Dallas Mavericks, winners of six straight, with a 104-97 victory at the MSG |
| | | 6 | Lin has now surpassed 20 points for the eighth time in nine contests on Sunday, as he shot 11-of-20 from the floor and 3-of-6 from the three-point line. He scored 16 points in the second half, which included a couple of timely three-pointers in the fourth quarter. |
| C | Food | 7 | Certain cultures highlight animal and vegetable foods in their raw state. Salads consisting of raw vegetables or fruits are common in many cuisines. Sashimi in Japanese cuisine consists of raw sliced fish or other meat, and sushi often incorporates raw fish or seafood. |

At block 605, a quality evaluation operation is performed to each microblog.

According to a quality score calculation method similar to that of block 612, the quality score of each microblog may be obtained. According to a quality score threshold corresponding to each category, it is determined whether a microblog passes the quality evaluation. If the quality evaluation is not passed, the microblog is removed. A result may be as shown in table 10.

TABLE 10

| Hot account | category | Quality score threshold | Microblog index | Microblog contents | Quality score | Quality score evaluation |
|---|---|---|---|---|---|---|
| B | basketball | 130000 | 5 | Jeremy Lin scored 28 points and dished out a career-high 14 assists as the New York Knicks got back on the winning column after defeating the Dallas Mavericks, winners of six straight, with a 104-97 victory at the MSG | 104586 | Not pass |
|  |  |  | 6 | Lin has now surpassed 20 points for the eighth time in nine contests on Sunday, as he shot 11-of-20 from the floor and 3-of-6 from the three-point line. He scored 16 points in the second half, which included a couple of timely three-pointers in the fourth quarter. | 244886 | pass |
| C | Food | 150000 | 7 | Certain cultures highlight animal and vegetable foods in their raw state. Salads consisting of raw vegetables or fruits are common in many cuisines. Sashimi in Japanese cuisine consists of raw sliced fish or other meat, and sushi often incorporates raw fish or seafood. | 123785 | Not pass |

After the quality evaluation, microblog 6 is selected as a hot microblog in the category "basketball".

In view of the above, according to the method provided by the examples of the present disclosure, it is possible to find hot microblog contents rapidly and accurately.

Figure 7:
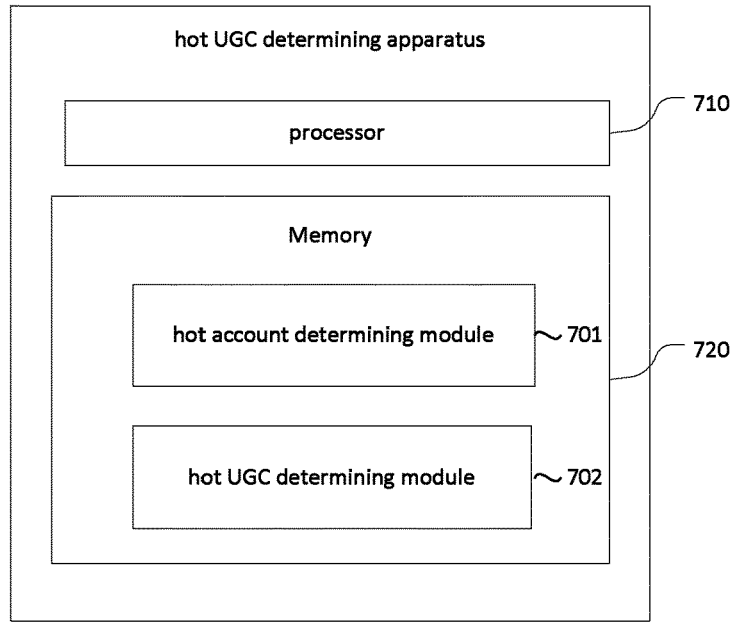
FIG. 7 is a schematic diagram illustrating an apparatus for determining a hot UGC according to an example of the present disclosure.

In accordance with the above method examples, an example of the present disclosure further provides an apparatus for determining a hot UGC. As shown in FIG. 7, the apparatus 700 includes: a processor 710 and a memory 720; wherein one or more program modules are stored in the memory 720 and to be executed by the processor 710, the one or more program modules comprise: a hot account determining module 701 and a hot UGC determining module 702.

The hot account determining module 701 is configured to
for each history UGC posted by each account, calculate a quality score of the history UGC and a correlation degree between the history UGC and each category, and
determine one or more accounts in each category as hot accounts according to quality scores and correlation degrees of the history UGCs.

The hot UGC determining module 702 is configured to
calculate, after receiving a UGC newly posted by a hot account, a quality score of the newly posted UGC and a correlation degree between the newly posted UGC and the category that the hot account belongs to;
determine whether the quality score is higher than a predefined quality score threshold and whether the correlation degree is higher than a predefined correlation degree threshold of the category; and
determine, if the quality score is higher than the predefined quality score threshold and the correlation degree is higher than the predefined correlation degree threshold of the category, the newly posted UGC as a hot UGC in the category that the hot account belongs to.

Figure 8:
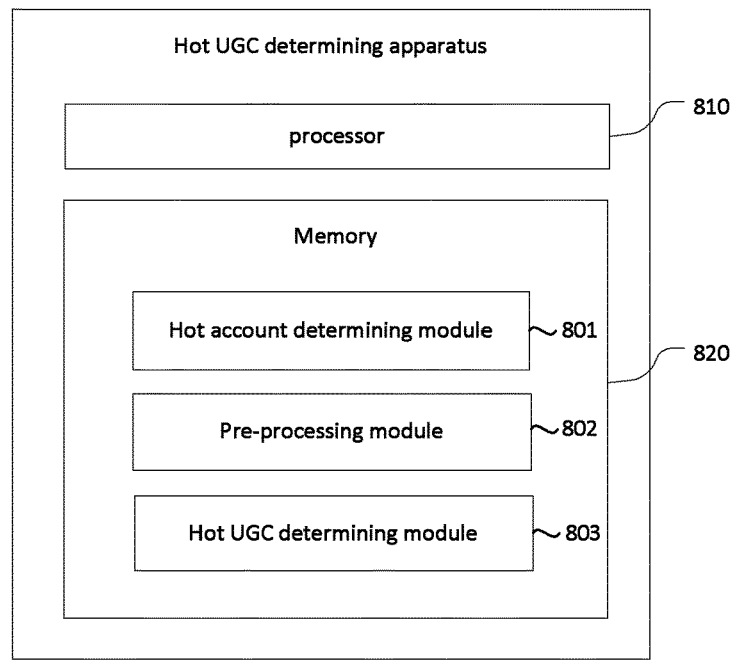
FIG. 8 is a schematic diagram illustrating an apparatus for determining a hot UGC according to another example of the present disclosure.

FIG. 8 is a schematic diagram illustrating an apparatus for determining a hot UGC according to another example of the present disclosure. As show in FIG. 8, the apparatus 800 includes: a processor 810 and a memory 820; wherein one or more program modules are stored in the memory 820 and to be executed by the processor 810, the one or more program modules comprise: a hot account determining module 801, a pre-processing module 802 and a hot UGC determining module 803.

The hot account determining module 801 is configured to
for each history UGC posted by each account, calculate a quality score of the history UGC and a correlation degree between the history UGC and each category, and
determine one or more accounts in each category as hot accounts according to quality scores and correlation degrees of the history UGCs.

The pre-processing module 802 is configured to
determine, after receiving a UGC newly posted by a hot account, whether the newly posted UGC contains a word in a blacklist;
discard the newly posted UGC if the newly posted UGC contains a word in a blacklist; and
provide the newly posted UGC to the hot UGC determining module 803 if otherwise.

The hot UGC determining module 803 is configured to
calculate, after receiving a newly posted UGC from the pre-processing module 802, a quality score of the newly posted UGC and a correlation degree between the newly posted UGC and the category that the hot account belongs to;

determine whether the quality score is higher than a predefined quality score threshold and whether the correlation degree is higher than a predefined correlation degree threshold of the category; and determine, if the quality score is higher than the predefined quality score threshold and the correlation degree is higher than the predefined correlation degree threshold of the category, the newly posted UGC as a hot UGC in the category that the hot account belongs to.

Figure 9:
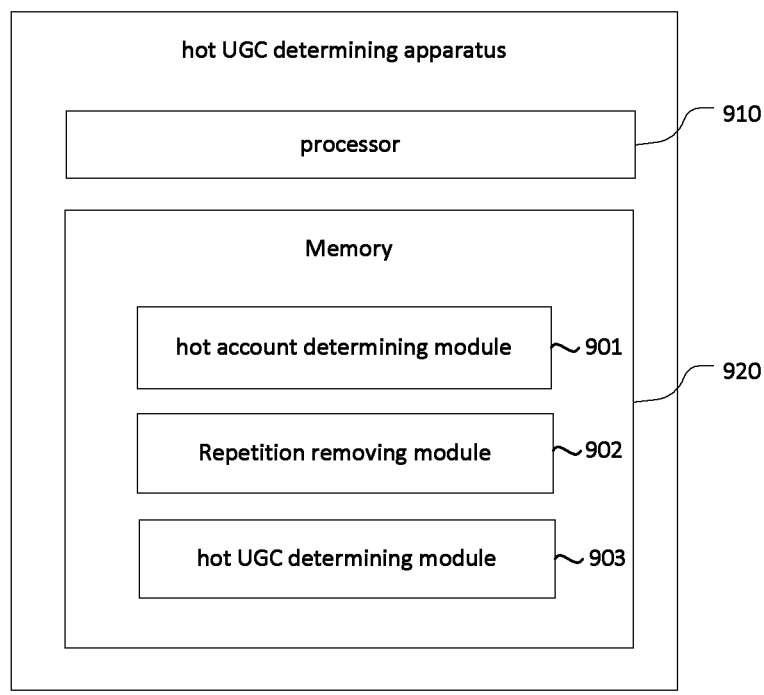
FIG. 9 is a schematic diagram illustrating an apparatus for determining a hot UGC according to still another example of the present disclosure.

FIG. 9 is a schematic diagram illustrating an apparatus for determining a hot UGC according to another example of the present disclosure. As show in FIG. 9, the apparatus 900 includes: a processor 910 and a memory 920; wherein one or more program modules are stored in the memory 920 and to be executed by the processor 910, the one or more program modules comprise: a hot account determining module 901, a repetition removing module 902 and a hot UGC determining module 903.

The hot account determining module 901 is configured to
for each history UGC posted by each account, calculate a quality score of the history UGC and a correlation degree between the history UGC and each category, and
determine one or more accounts in each category as hot accounts according to quality scores and correlation degrees of the history UGCs.

The repetition removing module 902 is configured to
determine whether at least two UGCs newly posted by a hot account are received;
calculate, if at least two UGCs newly posted by the hot account are received, a text similarity ratio of each two newly posted UGCs;
if the two newly posted UGCs have a text similarity degree higher than a predefined threshold, discard a UGC which is posted later and Provide a UGC which is posted earlier to the hot UGC determining module 903;
if the two newly posted UGCs have a text similarity degree not higher than the predefined threshold, provide the two newly posted UGCs to the hot UGC determining module 902.

The hot UGC determining module 903 is configured to
calculate, after receiving a newly posted UGC from the repetition removing module 902, a quality score of the newly posted UGC and a correlation degree between the newly posted UGC and the category that the hot account belongs to;
determine whether the quality score is higher than a predefined quality score threshold and whether the correlation degree is higher than a predefined correlation degree threshold of the category; and
determine, if the quality score is higher than the predefined quality score threshold and the correlation degree is higher than the predefined correlation degree threshold of the category, the newly posted UGC as a hot UGC in the category that the hot account belongs to.

The processor 910 may include one or more processors for executing the sets of instructions stored in the memory 920. The processor 920 is a hardware device, such as a central processing unit (CPU) or a micro controlling unit (MCU). The memory 920 is a non-transitory processor-readable storage media, such as a RAM memory, flash memory, ROM memory, EPROM memory, EEPROM memory, registers, hard disk, a removable disk, a CD-ROM, or any other form of non-transitory storage medium known in the art.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for displaying a hot User Generated Content (UGC), comprising:
   analyzing, by a server including at least a memory and a processor, a history UGC posted by an account in a UGC website system, and calculating, by the server, a quality score of the history UGC posted by the account and a correlation degree between the history UGC and a category, wherein calculating the quality score of the history UGC posted by the account comprising:
   obtaining, by the server, a total text length, a total number of words, a number of filtered words and a number of punctuations of the history UGC; and
   determining, by the server, the quality score of the history UGC posted by the account based on the total text length, the total number of words, the number of filtered words and the number of punctuations of the history UGC;
   determining, by the server, a number of effective words of the UGC, wherein the number of effective words = total number of words − the number of filtered words − the number of punctuations;

determining, by the server, a text basic score of the history UGC, wherein the text basic score =

$w5 \times$ number of effective words $+ w6 \times$ number of filtered words, w5 and w6 represent weight parameters;
   calculating, by the server, a number of repeated words and a word repetition ratio of the history UGC, wherein $$\text{the word repetition ratio} = \frac{\text{the number of repeated words}}{\text{the total number of words}};$$

determining, by the server, a text score of the history UGC, wherein the text score = the text basic score $\times \dfrac{\text{the number of effective words}}{\text{the total number of words}} \times$ $f1 \times (1 - \text{the word repetition ratio})/w4$, f1 represent a predefined function taking the number of punctuations and the total number of words as input parameters, w4 represent a weight parameter;

determining, by the server, a posted time and a time score of the history UGC, wherein the time score =

$$\frac{\text{the posted time of the } UGC - \text{a predefined reference time}}{w7},$$

w7 represent a weight parameter;

determining, by the server, the quality score of the UGC by evaluating the effective words and the posted time comprehensively in a weighted manner, wherein the quality score=w1×(w2×text score+w3×time score), w1, w2 and w3 represent weight parameters;

determining, by the server, a hot account for the category according to the quality score and the correlation degree of the history UGC;

after receiving at least two UGCs newly posted by the hot account, calculating, by the server, a text similarity ratio between each two newly posted UGCs, if the text similarity ratio between two newly posted UGCs is higher than a predefined threshold, reserving only the one which is posted earlier, calculating the quality score of the newly posted UGC and the correlation degree between the newly posted UGC and the category that the hot account belongs to, so that a subsequent calculation is only performed for the reserved earlier-posted UGC, a number of candidate UGCs is reduced and a workload of the server for the subsequent calculation is reduced;

determining, by the server, whether the quality score of the newly posted UGC is higher than a predefined quality score threshold, and whether the correlation degree between the newly posted UGC and the category that the hot account belongs to is higher than a predefined correlation degree threshold of the category;

determining, by the server, if the quality score of the newly posted UGC is higher than the predefined quality score threshold and the correlation degree between the newly posted UGC and the category that the hot account belongs to is higher than the predefined correlation degree threshold, that the newly posted UGC is a hot UGC; and displaying the hot UGC in a hot UGC webpage hosted by the server, such that, by determining the quality score of the newly posted UGC, the hot UGC is selected among the newly posted UGCs, the selected hot UGC is provided to targeted users to improve an efficiency of displaying the hot UGC, an amount of human-computer interactions is reduced, and a usage of machine resources and network bandwidth resources is reduced.

2. The method of claim 1, further comprising:

before calculating the quality score of the newly posted UGC and the correlation degree between the newly posted UGC and the category that the hot account belongs to, determining, by the server, whether the newly posted UGC contains a word in a blacklist;

if the newly posted UGC does not contain the word in the blacklist, performing, by the server, the process of calculating the quality score of the newly posted UGC and the correlation degree between the newly posted UGC and the category that the hot account belongs to.

3. The method of claim 1, wherein the process of calculating, by the server, the quality score of the newly posted UGC and the correlation degree between the newly posted UGC and the category that the hot account belongs to is performed, by the server, after the newly posted UGC is received, or is performed periodically, by the server, for each newly posted UGC received during a period of time.

4. The method of claim 1, wherein the analyzing, by the server, the history UGC posted by the account in the UGC website system, and calculating, by the server, the quality score of the history UGC posted by the account and the correlation degree between the history UGC and the category and determining the hot account for the category according to the quality score and correlation degree of the history UGC comprises:

obtaining, by the server, one or more history UGCs posted by the account during a period of time;

for each history UGC in the one or more history UGCs, calculating, by the server, the quality score of the history UGC and the correlation degree between the history UGC and each of a plurality of categories;

calculating, by the server, an average quality score of the account and an average correlation degree between the account and each category according to the quality score and correlation degree of each history UGC in the one or more history UGCs;

determining, by the server, a category that a highest correlation degree of the account corresponds to as the category that the account belongs to;

determining, by the server, for the account, whether the average quality score of the account is higher than a predefined average quality score threshold and whether the average correlation degree between the account and the category that the account belongs to is higher than a predefined average correlation degree threshold;

if the average quality score of the account is higher than the predefined average quality score threshold and the average correlation degree between the account and the category that the account belongs to is higher than the predefined average correlation degree threshold, determining, by the server, that the account is the hot account.

5. The method of claim 4, further comprising:

before calculating, by the server, the quality score of the history UGC and the correlation degree between the history UGC and each category, multiplying, by the server, the quality score of the history UGC with the correlation degree between the history UGC and each category to obtain a reliability degree of the history UGC in each category; and calculating, by the server, an average reliability degree of the account according to the reliability degree of the account in each category;

after determining, by the server, that the average quality score of the account is higher than the predefined average quality score threshold and the average correlation degree between the account and the category that the account belongs to is higher than the predefined average correlation degree threshold, determining, by the server, whether the average reliability degree of the account is higher than a predefined average reliability degree threshold, if the average reliability degree of the account is higher than the predefined average reliability degree threshold, determining that the account is the hot account.

6. The method of claim 1, wherein the calculating, by the server, the correlation degree between the history UGC and the category comprises:

calculating, by the server, the correlation degree according to a following formula:

the correlation degree=$W1*F1$ (weight)+$W2*F2$ (rate)+$W3*F3$ (rank);

W1, W2 and W3 represent three weight parameters;
weight denotes a weight of the category;
rate denotes a value that the weight of the category is divided by a total weight;
rank denotes a ranking position of the category in all categories;
F1 denotes a function for normalizing the weight to 0-1;
F2 denotes a function for normalizing the rate to 0-1;
F3 denotes a function for normalizing the rank to 0-1.

7. An apparatus for displaying a hot user generated content (UGC), comprising:
one or more processors;
a memory coupled to the one or more processors;
wherein the one or more processors are configured to
analyze a history UGC posted by an account, a quality score of the history UGC and a correlation degree between the history UGC and a category, wherein the quality score of the history UGC posted by the account is analyzed by:
obtaining a total text length, a total number of words, a number of filtered words and a number of punctuations of the history UGC; and
determining the quality score of the history UGC posted by the account based on the total text length, the total number of words, the number of filtered words and the number of punctuations of the history UGC, and
determine, for the category, one or more accounts as hot accounts according to the quality score and the correlation degree of the history UGC;
obtain the total text length, the total number of words, the number of filtered words and the number of punctuations of the history UGC;
determine a number of effective words of the UGC, wherein the number of effective words = total number of words −
the number of filtered words − the number of punctuations;

determine a text basic score of the history UGC, wherein the text basic score =
$w5$ × number of effective words + $w6$ × number of filtered words, w5 and w6 represent weight parameters;
calculate a number repeated words and a word repetition ratio of the history UGC, wherein the word repetition ratio = $\frac{\text{the number of repeated words}}{\text{the total number of words}}$;

determine a text score of the history UGC, wherein the text score = the text basic score × $\frac{\text{the number of effective words}}{\text{the total number of words}}$ × $f1$ × (1 − the word repetition ratio) / $w4$, f1 represent a predefined function taking the number of punctuations and the total number of words as input parameters, w4 represent a weight parameter;
determine a posted time and a time score of the history UGC, wherein the time score =
$\frac{\text{the posted time of the } UGC - \text{a predefined reference time}}{w7}$, w7 represent a weight parameter;
determine the quality score of the UGC, wherein
the quality score=$w1×(w2×\text{text score}+w3×\text{time score})$, w1, w2 and w3 represent weight parameters;
calculate, after receiving a UGC newly posted by the hot account, the quality score of the newly posted UGC and the correlation degree between the newly posted UGC and the category that the hot account belongs to;
determine whether the quality score of the newly posted UGC is higher than a predefined quality score threshold of the category and whether the correlation degree is higher than a predefined correlation degree threshold of the category; and
determine, if the quality score of the newly posted UGC is higher than the predefined quality score threshold of the category and the correlation degree is higher than the predefined correlation degree threshold of the category, the newly posted UGC as a hot UGC in the category that the hot account belongs to, and display the hot UGC in a hot UGC webpage;
calculate, if at least two UGCs newly posted by the hot account are received, a text similarity ratio of each two newly posted UGCs;
if the two newly posted UGCs have a text similarity degree higher than a predefined threshold, provide only the one which is posted earlier to the hot UGC determining module, so that a subsequent calculation is only performed for the earlier-posted UGC, a number of candidate UGCs is reduced and a workload of the processor for the subsequent calculation is reduced;
if the two newly posted UGCs have a text similarity degree not higher than the predefined threshold, provide the two newly posted UGCs to the hot UGC determining module;
such that, by determining the quality score of the newly posted UGC, the hot UGC is selected among the newly posted UGCs, the selected hot UGC is provided to targeted users to improve an efficiency of displaying the hot UGC, an amount of human-computer interactions is reduced, and a usage of machine resources and network bandwidth resources is reduced.

8. The apparatus of claim 7, wherein the one or more processors are further configured to:

determine, after receiving the UGC newly posted by the hot account, whether the newly posted UGC contains a word in a blacklist;

discard the newly posted UGC if the newly posted UGC contains a word in a blacklist; and provide the newly posted UGC to the hot UGC determining module if otherwise.

9. The apparatus of claim 7, wherein the one or more processors are further configured to:

obtain one or more history UGCs posted by the account during a period of time;

calculate, for each history UGC, the quality score of the history UGC and the correlation degree between the history UGC and each of a plurality of categories;

calculate, for the account, an average quality score of the account and an average correlation degree between the account and each category according to the quality scores and correlation degrees of the one or more history UGCs;

determine, for the account, a category that a highest correlation degree of the account corresponds to as the category that the account belongs to;

determine, for the account, whether the average quality score of the account is higher than a predefined average quality score threshold and whether the average correlation degree between the account and the category that the account belongs to is higher than a predefined average correlation degree threshold; and determine that the account is the hot account if the average quality score of the account is higher than the predefined average quality score threshold and the average correlation degree between the account and the category that the account belongs to is higher than the predefined average correlation degree threshold.

10. The apparatus of claim 7, wherein the one or more processors are further configured to:

before calculating the quality score of the history UGC and the correlation degree between the history UGC and the category, multiply the quality score of the history UGC with the correlation degree between the history UGC and the category to obtain a reliability degree of the history UGC in the category; and calculate an average reliability degree of the account according to the reliability degree of the account in the category;

after determining that the average quality score of the account is higher than the predefined average quality score threshold and the average correlation degree between the account and the category that the account belongs to is higher than the predefined average correlation degree threshold, determine whether the average reliability degree of the account is higher than a predefined average reliability degree threshold; and determine that the account is the hot account if the average reliability degree of the account is higher than the predefined average reliability degree threshold.

11. A non-transitory computer-readable storage medium comprising a set of instructions for displaying a hot user generated content (UGC), the set of instructions to direct at least one processor to perform acts of:

analyzing a history UGC posted by an account in a UGC website system, calculating a quality score of the history UGC posted by the account and a correlation degree between the history UGC and a category, determining a hot account for the category according to the quality score and the correlation degree of the history UGC, wherein calculating the quality score of the history UGC posted by the account comprising:

obtaining a total text length, a total number of words, a number of filtered words and a number of punctuations of the history UGC; and determining the quality score of the history UGC posted by the account based on the total text length, the total number of words, the number of filtered words and the number of punctuations of the history UGC;

obtaining the total text length, the total number of words, the number of filtered words and the number of punctuations of the history UGC;

determining a number of effective words of the UGC, wherein the number of effective words = total number of words − the number of filtered words − the number of punctuations determining a text basic score of the history UGC, wherein the text basic score =

$w5 \times$ number of effective words $+ w6 \times$ number of filtered words, w5 and w6 represent weight parameters;

calculating a number repeated words and a word repetition ratio of the history UGC, wherein the word repetition ratio = $\dfrac{\text{the number of repeated words}}{\text{the total number of words}}$;

determining a text score of the history UGC, wherein the text score = the text basic score $\times \dfrac{\text{the number of effective words}}{\text{the total number of words}} \times$ $f1 \times (1 - \text{the word repetition ratio})/w4$, f1 represent a predefined function taking the number of punctuations and the total number of words as input parameters, w4 represent a weight parameter;

determining a posted time and a time score of the history UGC, wherein the time score =

$\dfrac{\text{the posted time of the } UGC - \text{a predefined reference time}}{w7}$, w7 represent a weight parameter;

determining the quality score of the UGC, wherein the quality score=w1×(w2×text score+w3×time score), w1, w2 and w3 represent weight parameters;

after receiving at least two UGCs newly posted by the hot account, calculating a text similarity ratio between each two newly posted UGCs, if the text similarity ratio between two newly posted UGCs is higher than a predefined threshold, reserving only the one which is posted earlier, calculating the quality score of the newly posted UGC and the correlation degree between the newly posted UGC and the category that the hot account belongs to, so that a subsequent calculation is only performed for the reserved earlier-posted UGC, a number of candidate UGCs is reduced and a workload of the server for the subsequent calculation is reduced;

determining whether the quality score of the newly posted UGC is higher than a predefined quality score threshold and whether the correlation degree between the newly posted UGC and the category that the hot account belongs to is higher than a predefined correlation degree threshold of the category;

determining, if the quality score of the newly posted UGC is higher than the predefined quality score threshold and the correlation degree between the newly posted UGC and the category that the hot account belongs to is higher than the predefined correlation degree threshold, that the newly posted UGC is a hot UGC; and displaying the hot UGC in a hot UGC webpage, such that, by determining the quality score of the newly posted UGC, the hot UGC is selected among the newly posted UGCs, the selected hot UGC is provided to targeted users to improve an efficiency of displaying the hot UGC, an amount of human-computer interactions is reduced, and a usage of machine resources and network bandwidth resources is reduced.

12. The non-transitory computer-readable storage medium of claim 11, further comprising:

before calculating the quality score of the newly posted UGC and the correlation degree between the newly posted UGC and the category that the hot account belongs to, determining whether the newly posted UGC contains a word in a blacklist;

if the newly posted UGC does not contain the word in the blacklist, performing the process of calculating the quality score of the newly posted UGC and the correlation degree between the newly posted UGC and the category that the hot account belongs to.

13. The non-transitory computer-readable storage medium of claim 11, wherein the process of calculating the quality score of the newly posted UGC and the correlation degree between the newly posted UGC and the category that the hot account belongs to is performed after the newly posted UGC is received, or is performed periodically for each newly posted UGC received during a period of time.

14. The non-transitory computer-readable storage medium of claim 11, wherein the analyzing the history UGC posted by the account, and calculating the quality score of the history UGC posted by the account and the correlation degree between the history UGC and the category and determining the hot account for the category according to the quality score and correlation degree of the history UGC comprises:

obtaining one or more history UGCs posted by the account during a period of time;

for each history UGC, calculating the quality score of the history UGC and the correlation degree between the history UGC and each of a plurality of categories;

calculating an average quality score of the account and an average correlation degree between the account and each category according to the quality score and correlation degree of each history UGC;

determining a category that a highest correlation degree of the account corresponds to as the category that the account belongs to;

determining, for the account, whether the average quality score of the account is higher than a predefined average quality score threshold and whether the average correlation degree between the account and the category that the account belongs to is higher than a predefined average correlation degree threshold, if the average quality score of the account is higher than the predefined average quality score threshold and the average correlation degree between the account and the category that the account belongs to is higher than the predefined average correlation degree threshold, determining that the account is the hot account.

* * * * *